May 20, 1969     J. E. RANDOLPH     3,444,701

MOUNTING CLIP FOR FLEXIBLE SHAFTS

Filed March 14, 1967

INVENTOR
JOHN E. RANDOLPH
BY *R. C. Terry*
ATTORNEY

United States Patent Office 3,444,701
Patented May 20, 1969

3,444,701
MOUNTING CLIP FOR FLEXIBLE SHAFTS
John E. Randolph, Palatine, Ill., assignor to Teletype Corporation, Skokie, Ill., a corporation of Delaware
Filed Mar. 14, 1967, Ser. No. 623,059
Int. Cl. F16c 1/26, 1/10; B05b 15/06
U.S. Cl. 64—3                                                    1 Claim

ABSTRACT OF THE DISCLOSURE

A flexible plastic sleeve molded tightly around the guiding tube of a Bowden wire and flexible mounting members fitted around a bracket for supporting the sleeve and thereby supporting the Bowden wire.

Background of the invention

Flexible shafts, such as speedometer cables and Bowden wires, are frequently used to transfer motion from point to point. Utilization of such devices has heretofore been limited due to the lack of mounting devices which grip flexible shafts securely enough to completely prevent slippage between them and members to which they are attached. In order to be readily adaptable, mounting clips for flexible shafts must be substantially as flexible as the shafts and must be of a design which is readily adaptable to low cost manufacture and installation.

Summary of the invention

In the preferred embodiment of the invention a low cost, non-slipping mounting clip is comprised of a sleeve molded tightly around a flexible shaft and a mounting member formed integrally with the sleeve for supporting the sleeve and thereby supporting the shaft.

Brief description of the figures

A more complete understanding of the invention may be had by referring to the following detailed description when taken in conjunction with the drawing wherein.

Detailed description

Figure 2:
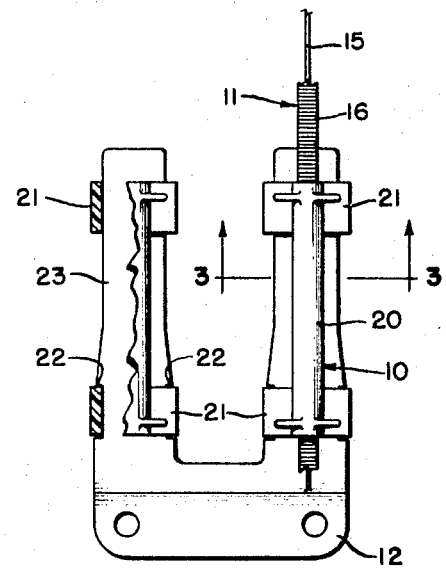
FIG. 2 is a top view of a mounting clip employing the present invention mounted on a straight bracket in which certain parts have been broken away more clearly to illustrate certain features of the invention.

Referring now to the drawing, wherein like reference numerals designate like parts throughout the several views, with particular reference being had to FIG. 2, there is shown a mounting clip 10 which supports a Bowden wire 11 on a straight bracket 12. The Bowden wire 11 is of the usual form and is comprised of an inner wire 15 slidably supported and guided in an outer guiding tubular member 16 which is comprised of a helically wound wire.

Figure 4:
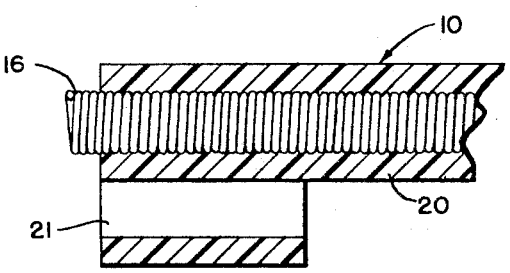
FIG. 4 is an enlarged sectional view taken along the lines 4—4 in FIG. 3.

The mounting clip 10 is formed from a flexible plastic material and is comprised of a sleeve 20 molded tightly around the outer member 16 of the Bowden wire 11 and a pair of support members 21 formed integrally with the tubular member 20. As is best shown in FIG. 4, when the tubular member 20 is molded around the guiding tube 16 of the Bowden wire 11 the plastic material flows into the interstices between the convolutions of the guiding tube 16 so that the mounting clip 10 is firmly secured to the relatively incompressible member 16. This prevents any slippage between the mounting clip 10 and Bowden wire 11 and thus allows the use of the Bowden wire 11 in applications where relatively high forces are applied to the inner wire 15. The helical nature of the outer member 16 allows the mounting clip to be removed by unthreading it from the guide tube 16.

Figure 3:
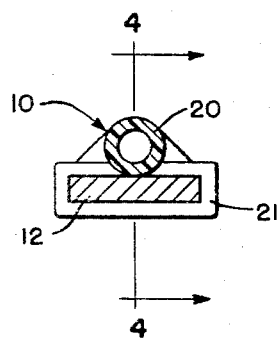
FIG. 3 is a sectional view taken along the line 3—3 in FIG. 2.

As is best shown in FIGS. 3 and 4 the mounting members 21 are in the form of hollow rectangular bodies extending parallel to the tubular portion 20 of the mounting clip 10. Since the mounting members 21 are formed from the same material as the tubular member 20 they are readily deformable. This allows the members 21 to be placed behind locating shoulders, such as the shoulders 22 of the clip receiving portions 23 of the bracket 12, thereby preventing relative movement between the mounting clip 10 and its supporting bracket and accurately locating the mounting clip with respect to the bracket. The mounting members 21 need not be of the precise form shown in the drawing and may take the form of male mounting members having flexible shoulders adapted to fit behind edges in holes in supporting brackets.

Figure 1:
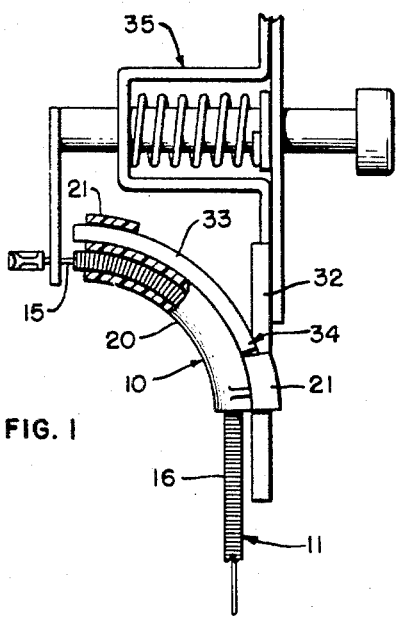
FIG. 1 is a side view of a mounting clip embodying the present invention used in conjunction with a curved support bracket which is attached to a push button device.

In the preferred embodiment the tubular member 20 of the mounting clip is substantially as resilient as the Bowden wire 11. As is shown in FIG. 1 this allows the mounting clip 10 to be used on curved brackets such as the bracket 32 and thus allows the end of the Bowden wire 11 to be positioned at right angles with respect to the main body portion of the Bowden wire. It should be noted that the curved clip receiving portion 33 of tthe bracket 32 has a shoulder 34 which retains the mounting clip 10 on the curved bracket 32. In FIG. 1 the Bowden wire 11 is shown having its inner wire 15 connected to a push button structure 35. The molding of the plastic material of the mounting clip 10 into the interstices between the convolutions of the guiding tube 16 prevents slippage of the tube 16 with respect to the push button structure 35 regardless of the force applied through the push button to the inner wire 15. The resiliency of the mounting members 21 allows the Bowden wire and mounting clip assembly to be quickly installed on and romoved from the push button structure 35.

A suitable material for the mounting clip 10 is polyurethane which may be easily molded around flexible shafts by injection molding. Other materials and manufacturing processes may be substituted, however.

Although only one embodiment of the invention is shown in the drawing and described in the foregoing specification, it will be understood that invention is not limited to the specific embodiment described, but is capable of modification and rearrangement and substitution of parts and elements without departing from the spirit of the invention.

What is claimed is:

1. A mounting clip for supporting a flexible shaft of the type comprised of a moveable inner member and an outer guiding tube formed from a helically wound length of wire, said mounting clip comprising:
- a sleeve molded around a portion of the guiding tube and filling the interstices between the helical turns thereof so that the sleeve and the guiding tube can be threadably engaged and disengaged, and
- resilient mounting means formed integrally with the sleeve.

References Cited

UNITED STATES PATENTS

| | | | |
|---|---|---|---|
| 1,680,000 | 8/1928 | Zubaty | 64—4 |
| 3,190,084 | 6/1965 | Moon et al. | 64—3 |
| 3,234,757 | 2/1966 | Stadelmann | 64—4 |
| 3,263,949 | 8/1966 | Conrad | 74—501 XR |
| 3,289,491 | 12/1966 | Conrad | 74—501 |

HALL C. COE, *Primary Examiner.*

U.S. Cl. X.R.

74—501; 248—74